United States Patent
Hemphill et al.

(10) Patent No.: US 10,358,171 B1
(45) Date of Patent: Jul. 23, 2019

(54) TAILGATE ANTI-CHUCK ASSEMBLY

(71) Applicant: Ford Global Technologies, LLC, Dearborn, MI (US)

(72) Inventors: Joshua Robert Hemphill, White Lake, MI (US); Jeffrey Hartley, Standish, MI (US); Jeffrey Gray, Dearborn, MI (US); Brian Kenneth Sullivan, Plymouth, MI (US); John Galligan, Highland Township, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/868,178

(22) Filed: Jan. 11, 2018

(51) Int. Cl.
*B62D 33/027* (2006.01)
*E05D 11/00* (2006.01)
*B62D 33/03* (2006.01)
*E05D 5/10* (2006.01)
*B62D 33/033* (2006.01)
*E05D 7/10* (2006.01)

(52) U.S. Cl.
CPC ......... *B62D 33/0273* (2013.01); *B62D 33/03* (2013.01); *B62D 33/033* (2013.01); *E05D 5/10* (2013.01); *E05D 11/0054* (2013.01); *E05D 7/1061* (2013.01); *E05Y 2900/546* (2013.01)

(58) Field of Classification Search
CPC ............. B62D 33/023; B62D 33/027; B62D 33/0273; B62D 33/03; B62D 33/033; E05D 5/0207; E05D 7/1061

USPC .................................... 296/50, 57.1, 59, 60
See application file for complete search history.

(56) References Cited

U.S. PATENT DOCUMENTS

| | | | |
|---|---|---|---|
| 6,769,729 B1 | 8/2004 | Bruford et al. | |
| 6,905,156 B2 * | 6/2005 | Miller | B62D 33/0273 16/308 |
| 7,287,799 B2 | 10/2007 | Austin | |
| 7,699,378 B2 * | 4/2010 | Smith | B62D 33/03 16/303 |
| 8,056,965 B2 | 11/2011 | Rosemann et al. | |
| 8,226,146 B2 | 7/2012 | Duffy et al. | |
| 8,387,211 B2 | 3/2013 | Kutschat | |

FOREIGN PATENT DOCUMENTS

FR   3002574 A1   8/2014

* cited by examiner

*Primary Examiner* — Jason S Daniels
(74) *Attorney, Agent, or Firm* — Brooks Kushman P.C.

(57) ABSTRACT

A vehicle truck box assembly including a tailgate, a hinge-on-box bracket, a puck component, a hinge post, and a plastic shim is provided. The tailgate is pivotally mounted to a truck bed. The hinge-on-box bracket includes a cup extension. The puck component is secured to the cup extension. The hinge post is for securing to the puck component and to a hinge-on-gate bracket and the hinge post defines a cavity. The plastic shim is received in the cavity for contacting the cup extension. The plastic shim may include an upper angle portion extending from a base portion. The upper angle portion may extend between the cup extension and the puck component that are arranged to snugly receive the hinge post. The upper angle portion may extend from the base portion at an angle value between five and fifteen degrees.

20 Claims, 5 Drawing Sheets

TAILGATE ANTI-CHUCK ASSEMBLY

TECHNICAL FIELD

This disclosure relates to tailgate assemblies for a vehicle pickup truck box.

BACKGROUND

Pickup trucks are motor vehicles with a front passenger area, often referred to as a cab, and an open top rear cargo area, often referred to as a truck box. The truck box usually has a substantially flat-bed from which two side body sidewalls and a forward interconnecting header extend upwardly from the bed. A bottom hinged door, commonly referred to as a tailgate, hinged at the rear edge of the bed is closed to provide a fourth wall for the cargo area. Assemblies facilitating tailgate pivotal movement are unacceptable if they fail to meet noise and vibration standards when the pickup truck is in operation.

This disclosure is directed to solving the above problems and other problems as summarized below.

SUMMARY

According to an aspect of the present disclosure, a vehicle truck box assembly includes a tailgate, a hinge-on-box bracket, a puck component, a hinge post, and a plastic shim. The tailgate is pivotally mounted to a truck bed. The hinge-on-box bracket includes a cup extension. The puck component is secured to the cup extension. The hinge post is for securing to the puck component and to a hinge-on-gate bracket and the hinge post defines a cavity. The plastic shim is received in the cavity for contacting the cup extension. The plastic shim may include an upper angle portion extending from a base portion. The upper angle portion may extend between the cup extension and the puck component that are arranged to snugly receive the hinge post. The upper angle portion may extend from the base portion at an angle value between five and fifteen degrees. A length of the upper angle portion may be defined by a distance from an edge of the puck component to an edge of the cup extension. The hinge post may include an upper portion having a cutaway region defined between two puck edges and sized to receive the upper angle portion of the plastic shim thereupon. Each of the two puck edges may define an axis. The axes may intersect one another to define an angle value between forty-five and seventy degrees from horizontal. The hinge post may include a first lower angle portion and the plastic shim may include a second lower angle portion. The first and second lower angle portions may be correspondingly sized to rest upon one another and minimize up and down movement of the truck box assembly.

According to another aspect of the present disclosure, an anti-chuck assembly for a vehicle tailgate includes a hinge-on-gate component, a post component, and a shim component. The hinge-on-gate component is for securing to a tailgate and includes a post aperture. The post component is for inserting within the post aperture and defines a cavity. The shim component is sized for partial insertion within the cavity and includes an upper angle portion extending from a base portion to align the post component for a substantially flush fit within a cavity defined by a hinge-on-box component and a puck component. The hinge-on-box component is for securing to a truck box pillar region. The hinge-on-box component may be metallic and the shim component may be non-metallic and sized such that the post component does not contact the hinge-on-box component. The upper angle portion may extend from the base portion of the shim component at an angle value between five and fifteen degrees. The upper angle portion may extend from an edge of the puck component to an edge of a cup extension of the hinge-on-box component to prevent contact between the post component and the hinge-on-box component. The upper angle portion may be of a length based on a length of a cutaway portion of the post component plus one to four millimeters. The post component may include an upper portion having a cutaway region defined between two puck edges each oriented at an angle to receive the upper angle portion of the shim component thereupon. The post component may include a first lower angle portion and the shim component may include a second lower angle portion. The first and second lower angle portions may be correspondingly sized to rest upon one another and minimize up and down movement of the anti-chuck assembly.

According to a further aspect of the present disclosure, a vehicle tailgate assembly includes a hinge-on-gate component, a post component, a puck component, a hinge-on-box component, and a shim. The hinge-on-gate component is for securing to a tailgate and includes a post aperture. The post component is sized to partially extend through the post aperture and includes a post cavity. The puck component includes a puck cavity to receive a portion of the post component and a puck extension. The hinge-on-box component is for securing to a truck box pillar and includes a cup extension to rotatably receive the puck component and defines a puck aperture for the puck extension to extend through. The shim is mounted to the post component such that the post component and the cup extension do not contact one another. The cup extension may be of a metallic material and the shim may be of a non-metallic material. The shim may include an upper angle portion extending from a base portion such that the post component sits snugly within the puck cavity. The post component may include an upper portion having a cutaway region defined between two puck edges and sized to receive the upper angle portion of the shim thereupon. Each of the two puck edges may define an axis. The axes may intersect one another to define an angle value between forty-five degrees and seventy degrees from horizontal. The post component may include a first lower angle portion and the shim may include a second lower angle portion. The first and second lower angle portions may be correspondingly sized to rest upon one another and minimize up and down movement of the tailgate assembly.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
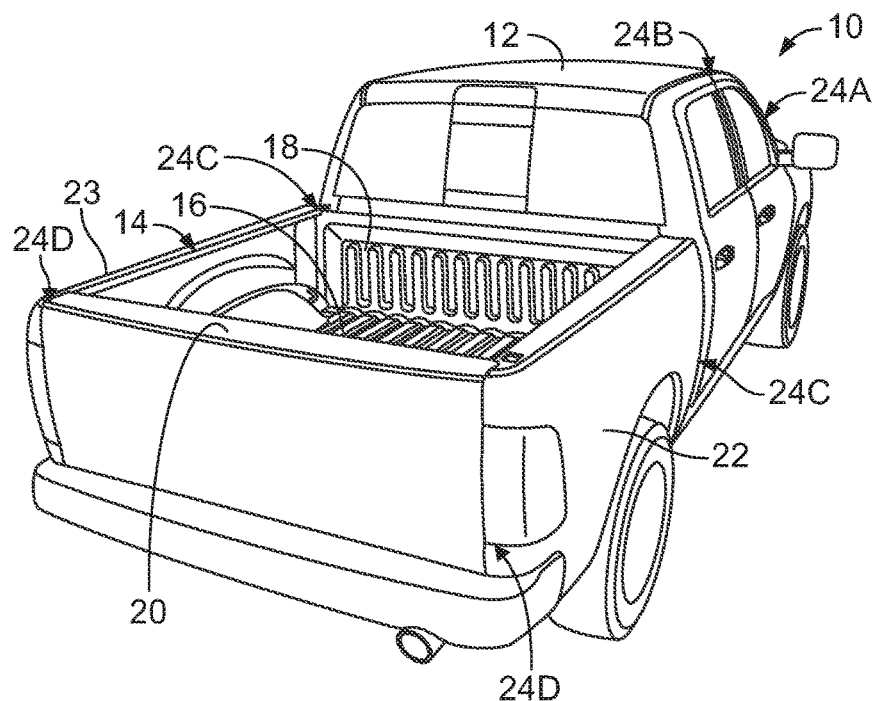
FIG. 1 is a rear perspective view of an example of a pickup truck.

FIG. 1 illustrates an example of a vehicle 10 that includes a cabin 12 and a truck box 14 supported by a vehicle chassis (not shown). The truck box 14 includes a bed 16 having a forward end adjacent to the cabin 12 and a rear end opposite the forward end. The bed 16 supports a header 18 at the forward end and a tailgate 20 at the rear end. The tailgate 20 is pivotally mounted to the truck box 14. The bed 16 supports a first sidewall 22 and a second sidewall 23. The header 18, the tailgate 20, the first sidewall 22, and the second sidewall 23 define a truck box cavity for positioning items therein. In this disclosure, the header 18 may also be referred to as a sidewall. The vehicle 10 includes an A-pillar region 24A, a B-pillar region 24B, a C-pillar region 24C, and a D-pillar region 24D. The vehicle 10 is a four-door configuration, however other configurations, such as a two-door configuration, may be adapted to incorporate the disclosed concepts. Alternate configurations may include different pillar region references.

The first sidewall 22 and second sidewall 23 are secured to the header 18 at forward box pillar regions of the truck box 14 or at the C-pillar regions 24C. The first sidewall 22, the second sidewall 23, and the header 18 are also secured to the bed 16. The tailgate 20 pivots between an open position and a closed position. In the closed position as shown in FIG. 1, each lateral end of the tailgate 20 may be removably attached to the first sidewall 22 and the second sidewall 23 at respective regions referred to as rear box pillar regions or the D-pillar regions 24D.

Figure 2:
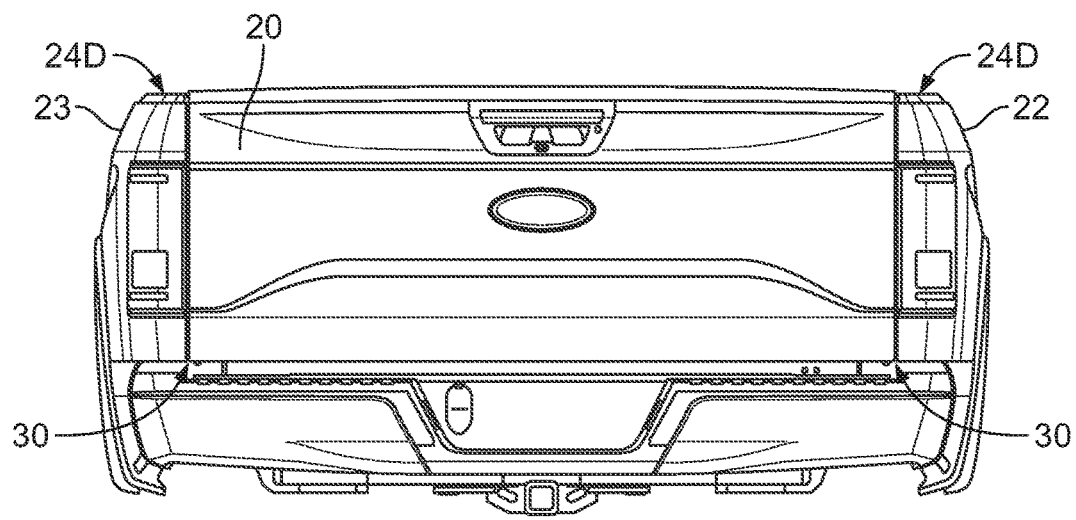
FIG. 2 is a rear view of a portion of an example of a tailgate assembly of a pickup truck.

FIG. 2 illustrates a detailed view of a rear portion of the truck box 14 including the tailgate 20 and the D-pillar regions 24D. A pair of pivot assemblies 30 are located at the D-pillar regions 24D and at respective corners of the tailgate 20. The pair of pivot assemblies 30 assist in facilitating pivotal movement of the tailgate 20 relative to the truck box 14.

Figure 3:
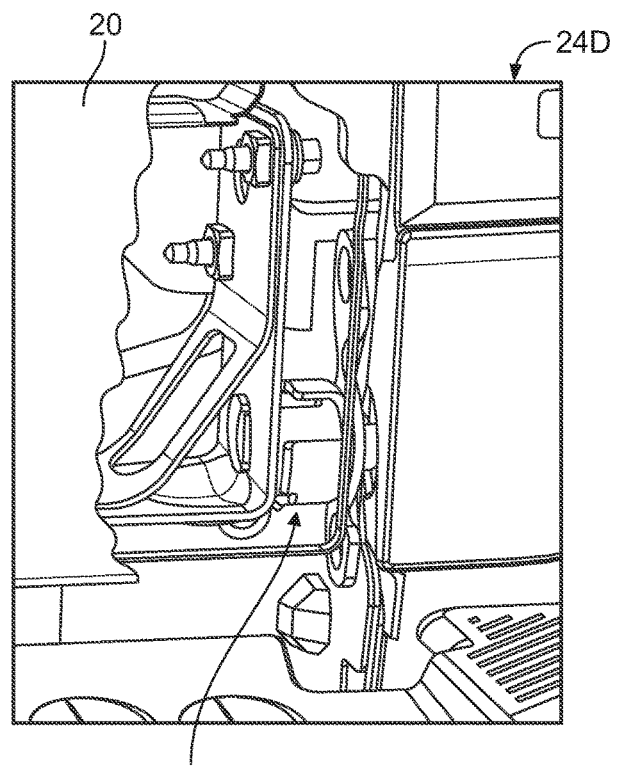
FIG. 3 is a detailed perspective view the tailgate assembly of FIG. 2 with a portion of a tailgate cutaway to show portions of an example of a pivot assembly.
Figure 4:
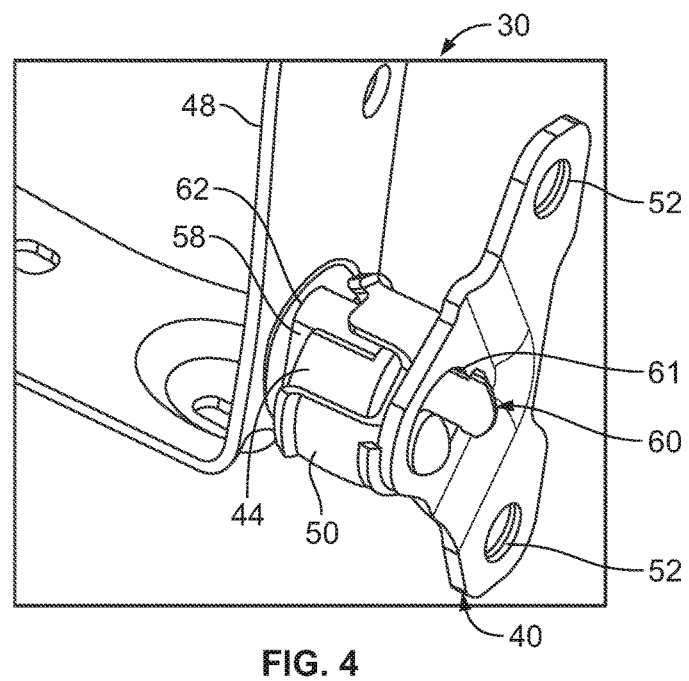
FIG. 4 is a rear perspective view of the pivot assembly of FIG. 3.
Figure 5:
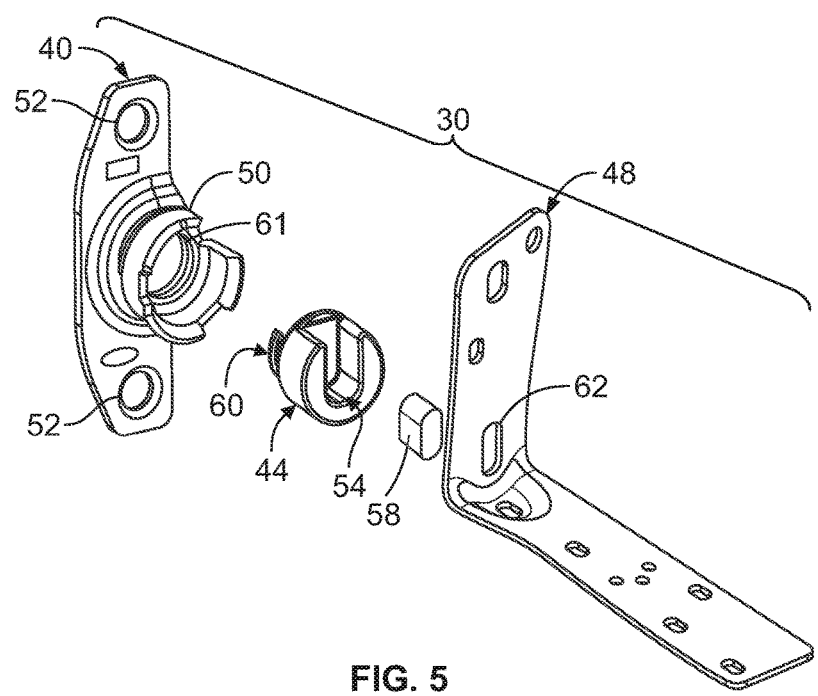
FIG. 5 is an exploded perspective view of the pivot assembly of FIG. 3.

FIGS. 3 through 5 illustrate further detail of one of the pivot assemblies 30. Each of the pivot assemblies 30 includes a hinge-on-box bracket 40, a puck component 44, and a hinge-on-gate bracket 48. The hinge-on-box bracket 40 includes a cup extension 50 sized to receive the puck component 44 for rotatable attachment thereto. The hinge-on-box bracket 40 includes a pair of apertures 52 to receive fasteners to secure the hinge-on-box bracket 40 an adjacent truck box pillar, such as the D-pillar region 24D described above. The hinge-on-box bracket 40 and the cup extension 50 may be formed of a metallic material such as steel. The puck component 44 defines a puck cavity 54 sized to receive a first end of a post 58 and includes a puck extension 60 for extending through a central aperture 61 of the hinge-on-box bracket 40. The hinge-on-gate bracket 48 may be L-shaped and define an aperture 62 sized to receive a second end of the post 58. The post 58 may be formed of a metallic material such as steel and may be secured to the hinge-on-gate bracket 48 via welds or other similar methods. The puck extension 60 and the hinge-on-box bracket 40 may be rotatably mounted to a truck box to assist in facilitating pivotal movement of the tailgate 20. The puck component 44, the hinge-on-gate bracket 48, and the post 58 may be secured to one another for simultaneous pivotal movement.

Figure 6:
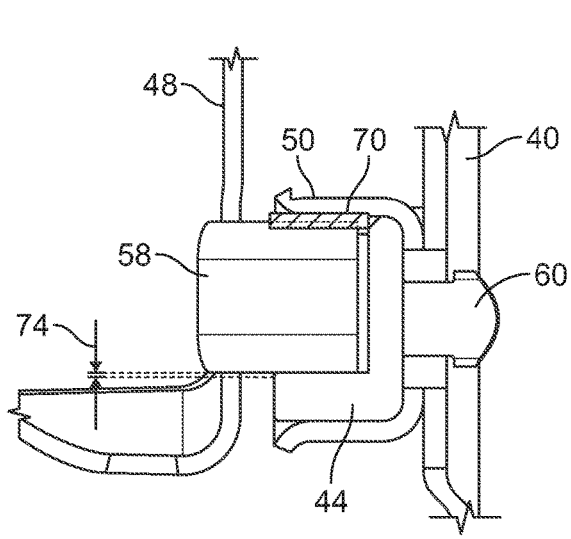
FIG. 6 is a side view, in cross-section, of the pivot assembly of FIG. 3.

FIG. 6 is a side view, in cross-section, of a portion of the pivot assembly 30 illustrating a metal to metal interface of the cup extension 50 and the post 58 at a first interface region 70. The metal to metal contact at the first interface region 70 may produce a noise objectionable to passengers. Additionally, the post 58 is arranged with the puck component 44 to define a gap 74. The first interface region 70 and the gap 74 contribute to a chucking movement in a Z-direction further increasing a volume of the objectionable noise. To minimize or eliminate the chucking movement and objectionable noise, a non-metallic shim may be included to soften the interface between the post 58 and the cup extension 50 and to close the gap 74.

Figure 7:
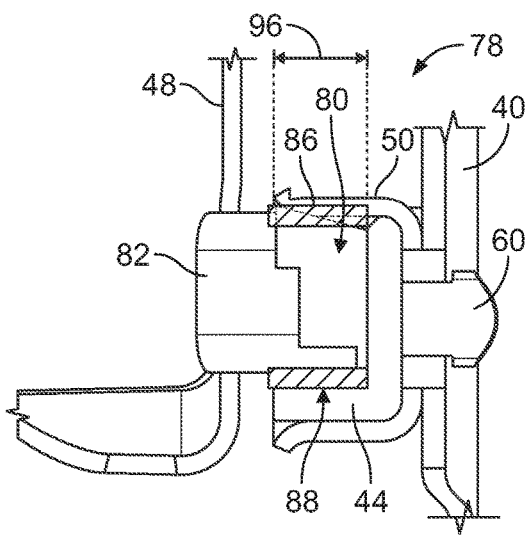
FIG. 7 is a side view, in cross-section, of an example of a portion of a tailgate anti-chuck assembly of a pickup truck.

FIG. 7 illustrates a side view, in cross-section, of a portion of an anti-chuck assembly 78 including a shim 80 and a modified post 82. For example, the shim 80 and the modified post 82 may be assembled with the hinge-on-box bracket 40, the puck component 44, and the hinge-on-gate bracket 48 to reduce chucking movement of the tailgate 20 and noise associated therewith. The shim 80 is of a non-metallic material. Inclusion of the shim 80 creates a non-metallic to metal interface of the cup extension 50 and the shim 80 at a second interface region 86 and eliminates the gap 74 at a third interface region 88. The shim 80 may be made of a durable plastic resilient to chemical and environmental conditions. The shim 80 minimizes or eliminates objectionable noise and chucking movement described above by providing a non-metallic to metal interface at the second interface region 86 and by orienting the modified post 82 and the puck component 44 to have a snug or substantially flush fit.

Figure 8:
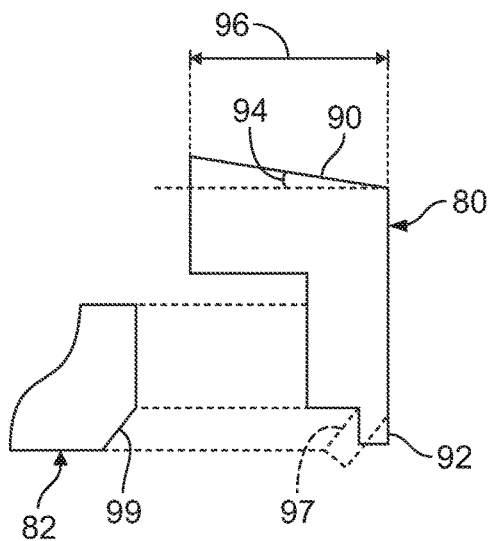
FIG. 8 is a side view of a shim component of the tailgate anti-chuck assembly of FIG. 7 and a side view, in cross-section, of an example of a post component.

FIG. 8 illustrates further detail of the shim 80. The shim 80 may include an angle portion 90 and a lower portion 92. The angle portion 90 may extend from the shim 80 at an angle 94. The angle 94 may have an angle value between five and fifteen degrees based on a size of the components of the anti-chuck assembly 78. The angle portion 90 extends from the shim 80 to contact the cup extension 50 (shown in FIG. 7) and to orient the modified post 82 snugly and substantially flush with the puck component 44. The angle portion 90 may have a length 96 (also shown in FIG. 7). The length 96 may be sized based on a length between an edge of the puck component 44 and an edge of the cup extension 50 such that only the shim 80 contacts the cup extension 50 and not the modified post 82. In one example, the length 96 of the shim 80 may be a length based on a length of a cutaway portion of the modified post 82 (described below)

plus one to four millimeters. The lower portion 92 assists in locating the shim 80 for a substantially flush mount to the modified post 82.

FIG. 8 also illustrates the shim 80 and the modified post 82 having corresponding angle regions to assist in securement and to further assist in minimizing chucking movement. The shim 80 may include a lower angle portion 97 and the modified post 82 may have an angle portion 99. The lower angle portion 97 and the angle portion 99 may be sized to correspond with one another and facilitate a substantially flush fit. Various angle values are available for the lower angle portion 97 and the angle portion 99.

Figure 9A:
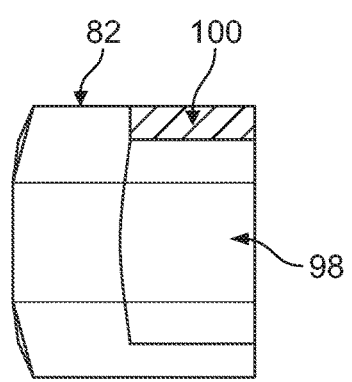
FIG. 9A is a side view, in cross-section, of another example of a post component of the tailgate anti-chuck assembly of FIG. 7.
Figure 9B:
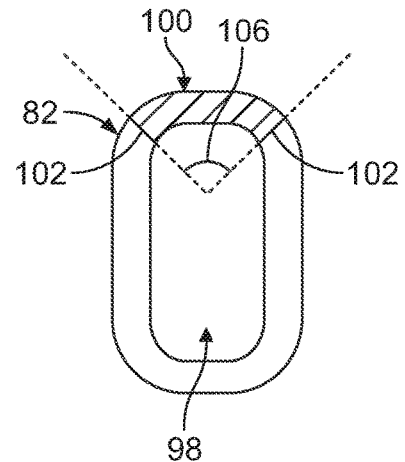
FIG. 9B is a front view of the post component of FIG. 9A.
Figure 10:
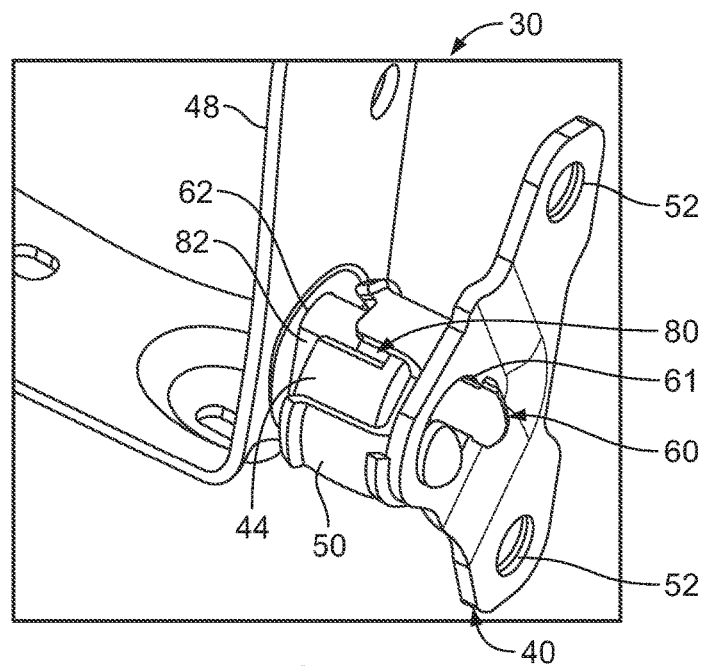
FIG. 10 is a perspective view of the tailgate anti-chuck assembly of FIG. 7 including the shim component of FIG. 8 and the post component of FIGS. 9A and 9B.
Figure 11:
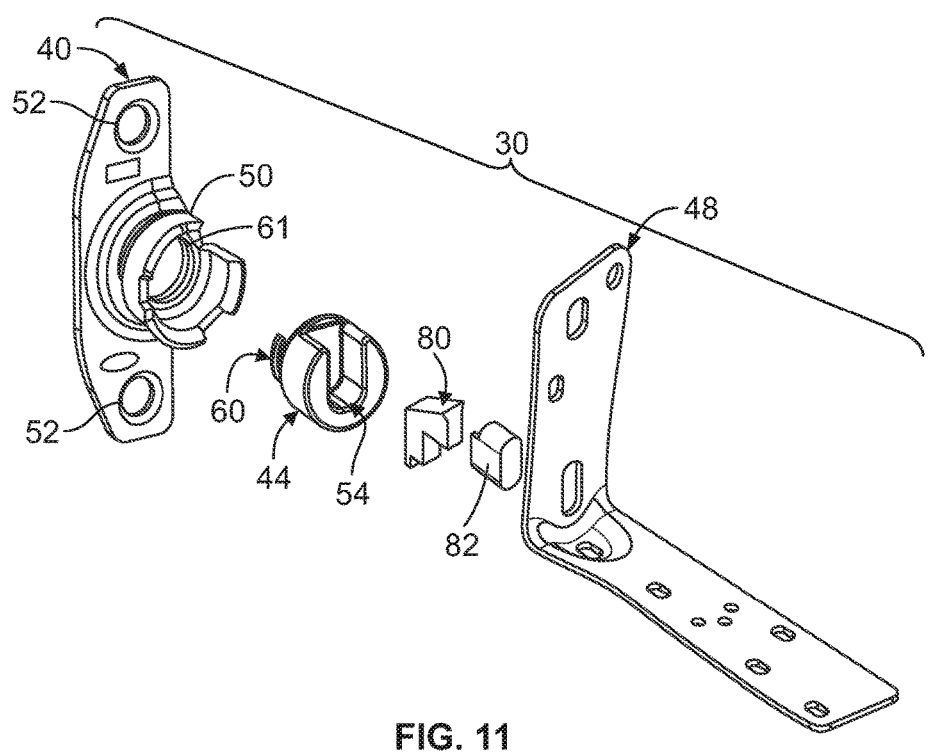
FIG. 11 is a perspective exploded view of the tailgate anti-chuck assembly of FIG. 10.

FIGS. 9A and 9B illustrate further detail of the modified post 82. The modified post includes a post cavity 98, a cutaway region 100, and edges 102. The post cavity 98 is sized to receive a portion of the shim 80. The cutaway region 100 is sized to orient the angle portion 90 of the shim 80 for contact with the cup extension 50 and to prevent contact between the modified post 82 and the cup extension 50. In one example, each of the edges 102 may define an axis that intersects with one another at an edge angle 106. The edge angle 106 may be an angle value between forty-five and seventy degrees from horizontal. FIGS. 10 and 11 illustrate a perspective view and an exploded view of the anti-chuck assembly 78 including the shim 80 and the modified post 82.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle truck box assembly comprising:
    a tailgate pivotally mounted to a truck bed;
    a hinge-on-box bracket including a cup extension;
    a puck component secured to the cup extension;
    a hinge post for securing to the puck component and to a hinge-on-gate bracket, wherein the hinge post defines a cavity; and
    a plastic shim received in the cavity that contacts the cup extension.

2. The assembly of claim 1, wherein the plastic shim includes an upper angle portion extending from a base portion, and wherein the upper angle portion extends between the cup extension and the puck component that are arranged to snugly receive the hinge post.

3. The assembly of claim 2, wherein the upper angle portion extends from the base portion at an angle value between five and fifteen degrees.

4. The assembly of claim 2, wherein a length of the upper angle portion is defined by a distance from an edge of the puck component to an edge of the cup extension.

5. The assembly of claim 2, wherein the hinge post includes an upper portion having a cutaway region defined between two puck edges and sized to receive the upper angle portion of the plastic shim thereupon.

6. The assembly of claim 5, wherein each of the two puck edges defines an axis, and wherein the axes intersect one another to define an angle value between forty-five and seventy degrees from horizontal.

7. The assembly of claim 1, wherein the hinge post includes a first lower angle portion and the plastic shim includes a second lower angle portion, and wherein the first and second lower angle portions are correspondingly sized to rest upon one another and minimize up and down movement of the truck box assembly.

8. An anti-chuck assembly for a vehicle tailgate comprising:
    a hinge-on-gate component for securing to a tailgate and including a post aperture;
    a post component for inserting within the post aperture and defining a cavity; and
    a shim component sized for partial insertion within the cavity and including an upper angle portion extending from a base portion to align the post component for a substantially flush fit within a cavity defined by a hinge-on-box component and a puck component,
    wherein the hinge-on-box component is for securing to a truck box pillar region.

9. The assembly of claim 8, wherein the hinge-on-box component is metallic and the shim component is non-metallic and sized such that the post component does not contact the hinge-on-box component.

10. The assembly of claim 8, wherein the upper angle portion extends from the base portion of the shim component at an angle value between five and fifteen degrees.

11. The assembly of claim 8, wherein the upper angle portion extends from an edge of the puck component to an edge of a cup extension of the hinge-on-box component to prevent contact between the post component and the hinge-on-box component.

12. The assembly of claim 11, wherein the upper angle portion is length is based on a length of a cutaway portion of the post component plus one to four millimeters.

13. The assembly of claim 8, wherein the post component includes an upper portion having a cutaway region defined between two puck edges each oriented at an angle to receive the upper angle portion of the shim component thereupon.

14. The assembly of claim 8, wherein the post component includes a first lower angle portion and the shim component includes a second lower angle portion, and wherein the first and second lower angle portions are correspondingly sized to rest upon one another and minimize up and down movement of the anti-chuck assembly.

15. A vehicle tailgate assembly comprising:
    a hinge-on-gate component for securing to a tailgate and including a post aperture;
    a post component sized to partially extend through the post aperture and including a post cavity;
    a puck component including a puck cavity to receive a portion of the post component and a puck extension;
    a hinge-on-box component for securing to a truck box pillar and including a cup extension to rotatably receive the puck component and defining a puck aperture for the puck extension to extend through; and
    a shim mounted to the post component such that the post component and the cup extension do not contact one another.

16. The assembly of claim 15, wherein the cup extension is of a metallic material and the shim is of a non-metallic material.

17. The assembly of claim 15, wherein the shim includes an upper angle portion extending from a base portion such that the post component sits snugly within the puck cavity.

18. The assembly of claim 17, wherein the post component includes an upper portion having a cutaway region defined between two puck edges and sized to receive the upper angle portion of the shim thereupon.

19. The assembly of claim 18, wherein each of the two puck edges defines an axis, and wherein the axes intersect one another to define an angle value between forty-five degrees and seventy degrees from horizontal.

20. The assembly of claim 15, wherein the post component includes a first lower angle portion and the shim includes a second lower angle portion, and wherein the first and second lower angle portions are correspondingly sized to rest upon one another and minimize up and down movement of the tailgate assembly.

\* \* \* \* \*